United States Patent [19]
Tiedemann et al.

[11] Patent Number: 5,385,793
[45] Date of Patent: Jan. 31, 1995

[54] THERMAL MANAGEMENT OF BATTERY SYSTEMS

[75] Inventors: William H. Tiedemann, Cedarburg, Wis.; John Newman, Kensington, Calif.

[73] Assignee: Globe-Union Inc., Milwaukee, Wis.

[21] Appl. No.: 916,965

[22] Filed: Jul. 20, 1992

[51] Int. Cl.⁶ .......................................... H01M 10/48
[52] U.S. Cl. ...................... 429/62; 429/120; 429/158; 429/159; 429/210
[58] Field of Search ............... 429/62, 120, 158, 159, 429/160, 161, 210

[56] References Cited

U.S. PATENT DOCUMENTS

| | | |
|---|---|---|
| 1,152,247 | 8/1915 | Walker . |
| 2,273,244 | 2/1942 | Ambruster . |
| 3,745,048 | 12/1970 | Dinkler et al. . |
| 3,767,468 | 10/1973 | Schusler . |
| 3,834,945 | 9/1974 | Jenson . |
| 4,007,315 | 2/1977 | Brinkmann et al. . |
| 4,463,064 | 7/1984 | Ruch ................................. 429/210 |
| 4,567,119 | 1/1986 | Lim .................................. 429/120 |
| 4,603,093 | 7/1986 | Edwards . |
| 5,212,024 | 5/1993 | Klink ................................ 429/120 |

FOREIGN PATENT DOCUMENTS

0391281  10/1990  European Pat. Off. .

*Primary Examiner*—José G. Dees
*Assistant Examiner*—Samuel Barts
*Attorney, Agent, or Firm*—Foley & Lardner

[57] ABSTRACT

An architecture, arrangement, or construction for battery systems such as monopolar and bipolar batteries is disclosed. The battery system includes a stack of bipolar or monopolar modules having current collectors extending from opposite sides of the battery system. The current collectors are located in cooling channels. The cooling channel is surrounded by an insulating material. The cooling channel contains a fluid which may be air, water, forced air, Freon ® or any other media useful in heating and cooling applications. The battery may be vented or a heat exchanger may be provided in communication with the cooling channels. The thermal management system is particularly useful in applications such as electric vehicles. Heat may be provided through the cooling channels in order to raise the temperature inside the battery system.

39 Claims, 8 Drawing Sheets

THERMAL MANAGEMENT OF BATTERY SYSTEMS

BACKGROUND OF THE INVENTION

The present invention relates to battery systems. In particular, the invention relates to a battery architecture, construction or arrangement which provides thermal management of the battery.

Batteries are utilized in such applications as electric vehicles, industrial systems, computers, as well as countless other applications. Particular applications, such as an electric car which is powered by a battery, require that the battery provide a large amount of energy and power and minimal weight and volume. For example, a battery in an electric car must be capable of providing a sufficient driving range and sufficient power for the vehicle to have acceptable driving performance. Further, these applications often also require that the battery be contained in small light packages. These packaging, power, and energy requirements often lead to heat dissipation problems.

Particularly, a large amount of heat is produced by the chemical reactions and the circuit paths which provide the power and energy needed to operate an electric vehicle. This phenomenon is partially the result of $I^2R$ heating in the battery. Thus, batteries should be thermally managed by cooling or dissipating heat to avoid battery malfunction.

Further, battery performance and battery life are temperature dependent. Batteries perform optimally in particular temperature windows. Thus, batteries may have to be heated or cooled to obtain optimum battery performance and long battery life. For instance, a battery may have to be thermally managed by heating to operate the battery in an optimum temperature range.

The construction of prior art battery systems is not adapted for proper thermal management. Generally, batteries are comprised of smaller individual battery cells or modules. Each cell or module is encapsulated in a plastic or other insulative material. These cells or modules are also all contained in a main plastic or insulative material. Thus, heat which is generated in the individual cells must pass through the individual cell walls and the main battery containment, both of which often are poor thermal conductors.

Heretofore, batteries or battery systems have been cooled by fans, cooling coils, or arrangements employing spaces between individual battery cells. These systems have been found to be uneconomical or ineffective for applications in which the battery generates large amounts of heat. Further, these systems often utilize moving parts or hazardous materials in the thermal management systems thereby undermining reliability.

U.S. Pat. No. 1,152,247, issued to Walker on Aug. 31, 1915, discloses a battery which utilizes a corrugated metal jar. An inner jar of suitable nonconducting material for housing electrochemical components is placed within the outer metal jar. Air passages within the corrugated sides of the metal jar provide a means for cooling the battery system within the inner jar.

U.S. Pat. No. 4,007,315, issued to Brinkmann et al. on Feb. 8, 1977, discloses a multi-cell battery cooling system utilizing cooling elements immersed in the electrolyte. The cooling elements are connected in series or in parallel to the individual cells. The cooling elements have high heat conductivity and electric resistance. This system is disadvantageous as it requires a cooling system and cooling elements to cool the battery effectively.

U.S. Pat. No. 3,834,945, issued to Jenson on Sep. 10, 1974, shows a water cooled industrial battery. The water cooled industrial battery includes intercell connectors with a water passage molded into the intercell connectors. Water is caused to flow through the passage for thermally managing the battery. The cells of the battery are arranged in a four by six matrix with all intercell connectors on one side of the battery.

Thermal management systems for batteries are constrained by various design criteria. Particularly, a thermal management system should be: 1. simple and reliable; 2. of minimal volume; 3. of minimal weight; 4. compatible with the environment of the application and battery; 5. of minimal impact on energy per unit mass, energy per unit volume, power per unit mass, and power per unit volume; and 6. of minimal cost. These six design ideals for a thermal management system may be approached by utilizing an arrangement which advantageously provides a heat conductive path from the inside of the battery to the outside of the battery. Further, an ideal thermal management system utilizes existing battery components to provide the heat conductive path.

SUMMARY OF THE INVENTION

The present invention provides a construction for a battery. The construction includes a plurality of cells, intercell conductors coupled between the cells, and an insulating wall. The insulating wall surrounds the intercell conductors so that a channel is formed adjacent the conductors. The channel allows fluid to flow around the intercell conductors so that the battery is cooled.

The present invention also provides a monopolar battery. The monopolar battery includes a plurality of monopolar modules arranged in a stack. A first of the modules in the stack has a negative terminal on a first side of the stack and a positive terminal on a second side of the stack. A second of the modules in the stack has a positive terminal on the first side of the stack and a negative terminal on the second side of the stack. A first conductor is coupled to the negative terminal of the first module and the positive terminal of the second module. An insulator situated around the first conductor defines a cavity. A fluid within the cavity thermally regulates the battery.

The fluid may be liquid or gas, such as water, air, forced air, ethylene glycol, Freon ® or any other media useful in heating and cooling applications. The invention also may include a stack which is comprised of monopolar modules connected in series.

The invention also provides a bipolar battery. The bipolar battery includes a plurality of bipolar modules arranged in a stack wherein a first of the modules in the stack has a negative terminal and a second of the modules in the stack has a negative terminal. A conductor couples the negative terminal of the first module and the negative terminal of the second module. An insulator which is located adjacent the conductor defines a cavity. A fluid within the cavity thermally regulates the battery.

The fluid may be liquid or gas such as air, forced air, ethylene glycol, Freon ® or any other media useful in heating and cooling applications. The invention also may include a stack which is comprised of bipolar modules connected in parallel. The bipolar modules may be comprised of a plurality of bipolar cells coupled in series.

The present invention also relates to a battery including a first unit having a positive terminal and a first shared negative terminal, a second unit having a first shared positive terminal and a first shared negative terminal, and a third unit having a negative terminal and the first shared positive terminal. A first wall is provided over the first shared positive terminal and the first positive terminal. The first wall demarcates at least one first tunnel for allowing a fluid to thermally manage the battery. A second wall is provided over the first shared negative terminal and the first negative terminal. The second wall demarcates at least one second tunnel for allowing fluid to thermally manage the battery.

The present invention also provides a battery including an array of modules arranged in an end-plate to end-plate configuration. The modules are enclosed in a cell casing. End-plate current collectors extend in opposite directions out of the cell casing. The end-plate current collectors serve as thermal dissipaters.

The present invention also relates to a thermal management system for a battery. The thermal management system includes cell packages arranged in a tower and current collectors provided through the cell packages. The tower has a first current collector side, a second current collector side, a front side, a back side, a top and a bottom. The current collectors are provided through the cell packages on the first current collector side and the second current collector side. Certain current collectors on the first current collector side are coupled to other current collectors on the first current collector side. Certain current collectors on the second current collector side are coupled to other current collectors on the second current collector side. An insulating means for insulating the current collectors is provided over the current collectors on the first current collectors side and the second current collectors side. The insulating means is partitioned into channels which provide thermal governance of the current collectors.

The present invention also relates to a method for manufacturing a battery. The method comprises the steps of providing current collectors through opposite ends of battery cells, stacking the battery cells so that the cells are configured in an arrangement with the current collectors extending from a first side and a second side of the arrangement, coupling selected current collectors to other selected current collectors, and containing certain current collectors in insulating channels which allow fluid to heat or cool the certain current collectors.

The present invention also relates to a construction for a battery which comprises a plurality of cell packages. Each cell package is enclosed by a cell wall, and each cell package has a positive current collector and a negative current collector. A plurality of intercell conductors electrically couple the positive current collectors and the negative current collectors. A plurality of channel dividers separate certain intercell conductors. A main enclosure surrounds the cells, the intercell conductors, and the channel dividers. The main enclosure, the cell walls, and the channel dividers form flow channels. Certain intercell conductors are located in the flow channels.

BRIEF DESCRIPTION OF THE DRAWINGS

Preferred exemplary embodiments of the present invention will hereinafter be described in conjunction with the appended drawings wherein like designations denote like elements.

DETAILED DESCRIPTION OF PREFERRED EXEMPLARY EMBODIMENTS

Figure 1:
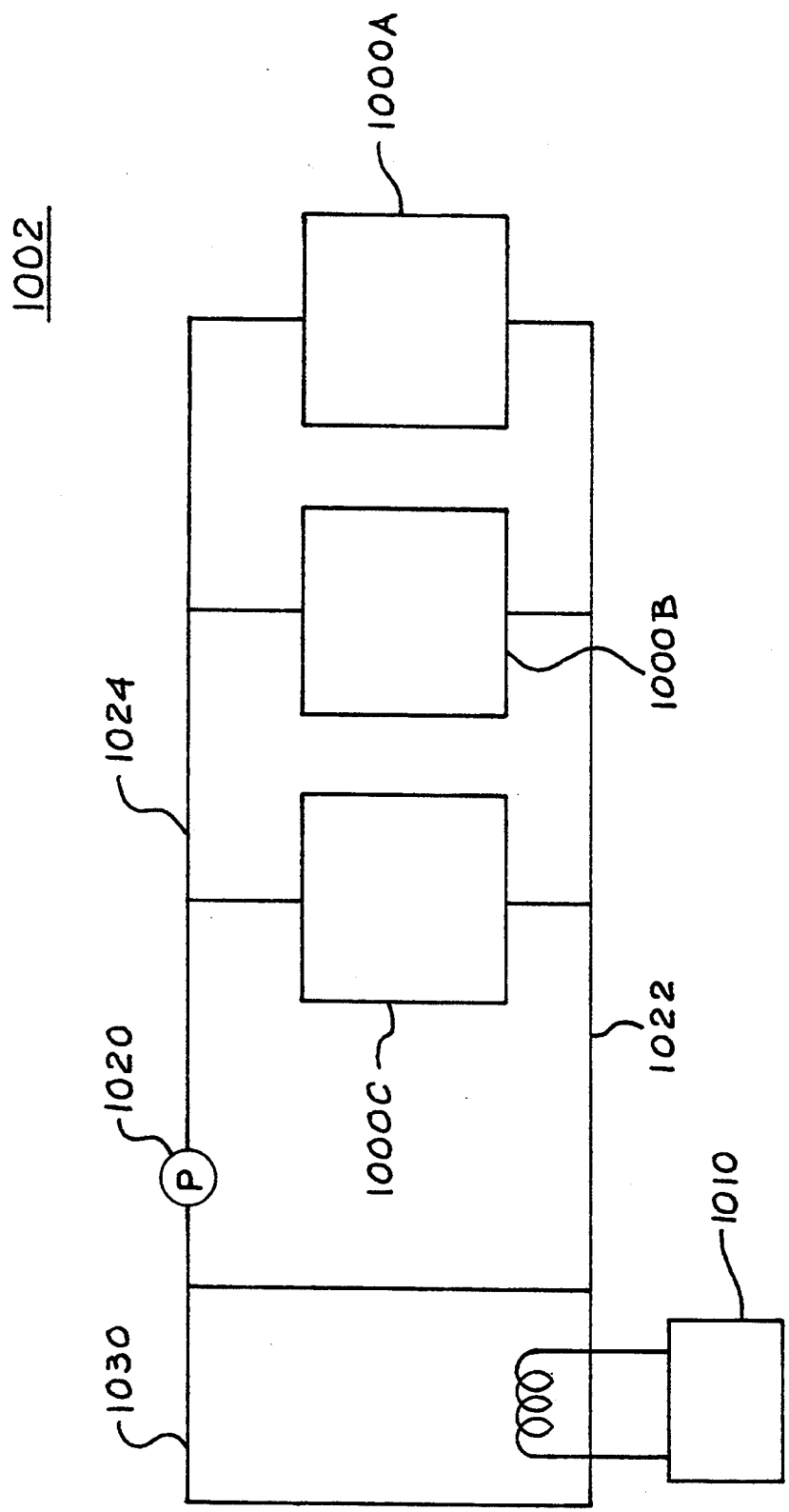
FIG. 1 is a schematic block diagram of a battery system employing batteries in accordance with preferred exemplary embodiments of the present invention.

With reference to FIG. 1, a battery system 1002 employs batteries 1000A–C in accordance with the preferred exemplary embodiments of the present invention. Battery system 1002 further includes a reservoir 1030, a pump 1020, and a heating/cooling means 1010. Batteries 1000A–C which are designed for optimal thermal management include channels coupled to pump 1020 via a line 1024 and to reservoir 1030 via a line 1022. Pump 1020 may be a fan, heat pump or other device for moving fluid through battery system 1002. The components shown in FIG. 1 are not shown in a limiting sense with respect to batteries 1000A–C. Batteries 1000A–C may be employed in various types of battery systems without departing from the scope of the invention as discussed in the claims.

Pump 1020 pushes fluid through batteries 1000A–C and into reservoir 1030. A heating/cooling unit 1010 provides heat or dissipates heat from reservoir 1030. Heating/cooling unit 1010 may be an electric coil for heating or a refrigeration coil for cooling. Thus, batteries 1000A–C in battery system 1002 are heated or cooled by fluid traveling through lines 1024 and 1022.

Batteries 1000A–C are generally comprised of a plurality of modules or units. Each module or unit includes at least one battery cell or fuel cell. These modules or units are interconnected in series or in parallel to provide an appropriate voltage and current capacity. The electrochemical components which make up the modules or units are contained in a cell encasement or package.

Heat is generally built up within the cell encasement or package. Batteries 1000A–C are preferably designed so that current collectors within batteries 1000A–C provide a highly heat conductive path in contact with lines 1024 and 1022. The high heat conductive path within batteries 1000A–C allow the components within the modules to be thermally managed by the fluid in lines 1024 and 1022. The fluid may be air, ethylene glycol, Freon ®, or water.

Figure 2:
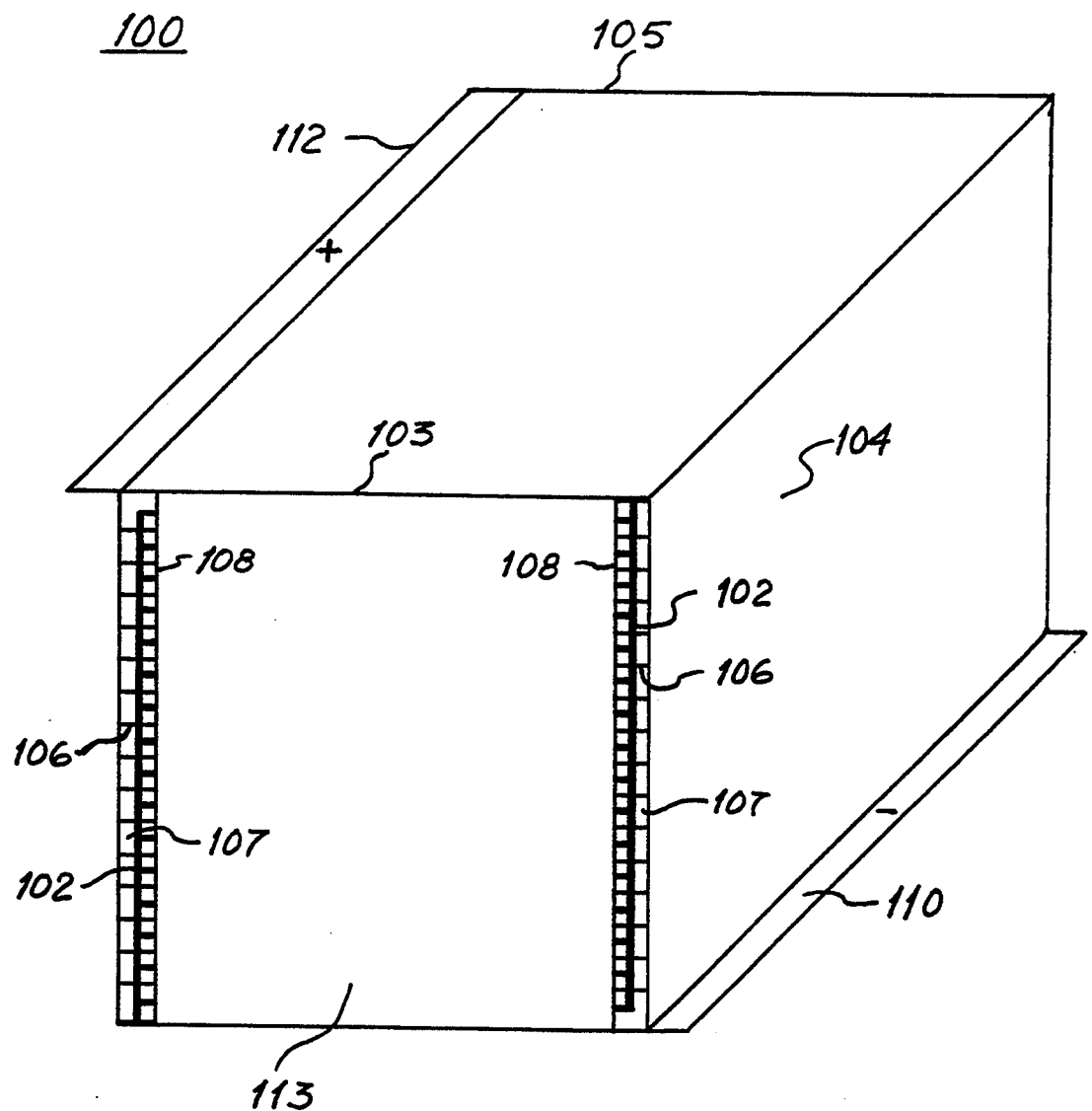
FIG. 2 is a schematic perspective view of a battery in accordance with the first preferred exemplary embodiment of the present invention.

With reference to FIG. 2, a bipolar battery 100 in accordance with a first preferred exemplary embodiment includes parallel interconnectors 102, main enclosure 104, channel dividers 106, cell walls 108, a stack 113 of modules, an external electrical interconnection 110, an external interconnection 112. Battery 100 is arranged in a stack 113 of bipolar modules. The modules are interconnected by parallel interconnectors 102 located in cooling channels 107.

Cooling channels 107 are defined by cell walls 108, channel dividers 106 and main enclosure 104. Preferably, channels 107 are tunnels provided from side 103 to side 105 of battery 100. Cooling channels 107 are preferably rectangular but may be any other suitable shape. The fluid provided through channels 107 may be coupled to lines 1024 and 1022 to receive fluids as discussed with reference to FIG. 1. A fan or other means may be applied to cooling channels 107 to force air or other fluids through cooling channels 107. Alternatively, channels 107 may be vented to the exterior of battery 100. For example, channels 107 may be arranged vertically so that natural connection allows the heat to rise through channels 107 and out of battery 100. As another example, battery 100 may be designed so that channels 107 utilize the air flow associated with a moving electric vehicle.

As heat is produced in the individual modules in battery 100, the heat is dissipated to sides 103 and exits cell walls 108 through the current collectors (not shown). Interconnectors 102 which are coupled to the current collectors provide greater surface area for heat to dissipate in cooling channels 107. Preferably, interconnectors 102 are shaped with maximum surface area in order to provide maximum heat dissipation. Interconnectors 102 may be shaped in such heat sink configuration as fins, or other geometries for advantageously dissipating heat.

Alternatively, battery 100 may be heated when battery 100 is used in temperatures below the optimum operating temperatures. Heated air or other media may be provided through channels 107. Alternatively, the exterior of battery 100 may be heated. The air or other media in channels 107 heats connectors 102 which in turn provide heat to the current collectors. The current collectors provide heat to the interior of the individual modules.

Figure 3:
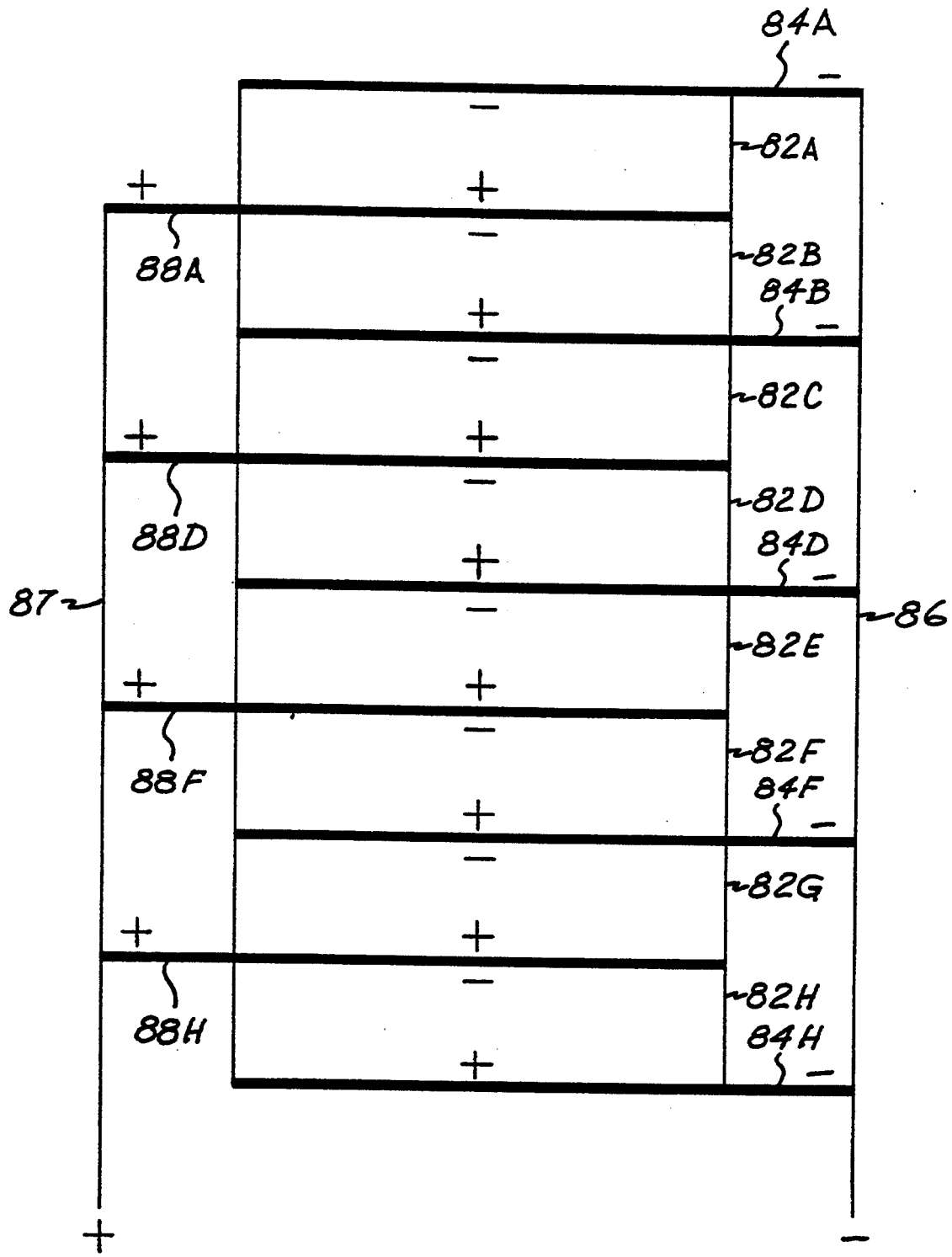
FIG. 3 is a schematic of a battery in accordance with the first preferred exemplary of the present invention.

With reference to FIG. 3, a bipolar battery 80 in accordance with the first preferred exemplary embodiment includes units or modules 82A, 82B, 82C, 82D, 82E, 82F, 82G and 82H. Modules 82A–H are arranged in a stack similar to stack 113 discussed with reference to FIG. 2. Modules 82A–H are stacked with positive and negative terminals on opposite top and bottom sides from adjacent modules 82A–H. For example, module 82B has a positive terminal on the top side, and module 82C has a positive terminal on the bottom side. Preferably, each of modules 82A–H is enclosed in a cell package.

In the most preferred embodiment, modules 82A–82H are 324 volt bipolar batteries. Each of modules 82A–82H includes 80 4.05 volt bipolar cells. Each of the cells in the modules 82A–H is serially connected to adjacent cells. Each of modules 82A–H includes one top cell similar to cell 21 and a bottom cell similar to cell 21. The top cell and bottom cell or the end cells are the first and last cells in each of modules 82A–H.

Current collectors 88A–H and 84A–H generally extend from the top and bottom bipolar cells in each individual module 82A–H at the bipolar substrates (not shown). Current collectors 88A–H and 84A–H extend from the cell in a direction perpendicular to current flow within each module.

Collectors 88A–H and 84A–H may be part of the bipolar substrates or a metal, carbon, or plastic attachment to the substrates on the end cells. Preferably, collectors 88A–H are sized to extend out of modules 82A–H and are as wide as the substrates.

The configuration of the bipolar cell allows the heat generated at the center of the cell to be dissipated through the large surface area of bipolar substrates. The small distance between the bipolar substrates which is much less than the length and width of the bipolar substrates allows heat to be dissipated out of the cell more easily.

Battery 80 includes a negative current collector 84A which is coupled to a negative current collector 84B, a negative current collector 84D, a negative current collector 84F, and a negative current collector 84H via an intercell conductor 86. A positive current collector 88A is coupled to a positive current collector 88D, a positive current collector 88F, and a positive current collector 88H via an intercell conductor 87. Conductors 86 and 87 are similar to conductors 102 discussed with reference to FIG. 2.

Negative current collectors 84B, 84D, and 84F are shared current collectors. A share negative current collector receives negative charges from the modules adjacent to the current collector. For instance, shared negative current collector 84B receives electrons from modules 82B and 82C. Similarly, positive current collectors 88A, 88D, and 88F are shared current collectors. For instance, electrons flow from shared positive current collector 88F into modules 82E and 82F.

Negative current collectors 84A, 84B, 84D, 84F, and 84H and positive current collectors 88A, 88D, 88F, and 88F are coupled to the respective bipolar substrates in their respective module 82A–H. For instance, negative current collector 84A is coupled to a negative bipolar substrate in module 82A. Positive current collector 88A is coupled to a positive bipolar substrate in module 82A and a positive bipolar substrate in module 82B. As stated above, positive current collector 88A is a shared current collector. Modules 82A–H are coupled in parallel in order to build current and energy capacity for battery 80.

The end-plate to end-plate construction of battery 80 allows heat to be advantageously dissipated from the encasement of modules 82A–H. Heat is generally produced in the center of modules 82A–H. Heat must be dissipated to the exterior of battery 80. The construction of battery 80 allows heat to be collected by positive current collectors 88A–H and negative current collectors 84A–H. The high heat conductivity of current collectors 84A–H and 88A–H readily transports heat from the interior of modules 82A–H to the exterior of modules 82A–H. Thus, heat flows parallel to the current in modules 82A–H and is removed from battery 80 across positive current collectors 88A–H and negative current collectors 84A–H.

Positive current collectors 88A–H and negative current collectors 84A–H are generally comprised of a metal material and therefore have high heat conductivity. This high heat conductivity allows battery 80 to be cooled much more effectively because the walls of modules 88A–H are generally comprised of an insulator and thus generally have poor heat conductivity. Alternatively, collectors 84A–H and 88A–H are made from a carbonic material. Therefore, the construction of battery 80 allows heat to be transported out of modules 82A-H through a path comprising collectors 84A-H which have high heat conductivity.

Figure 4:
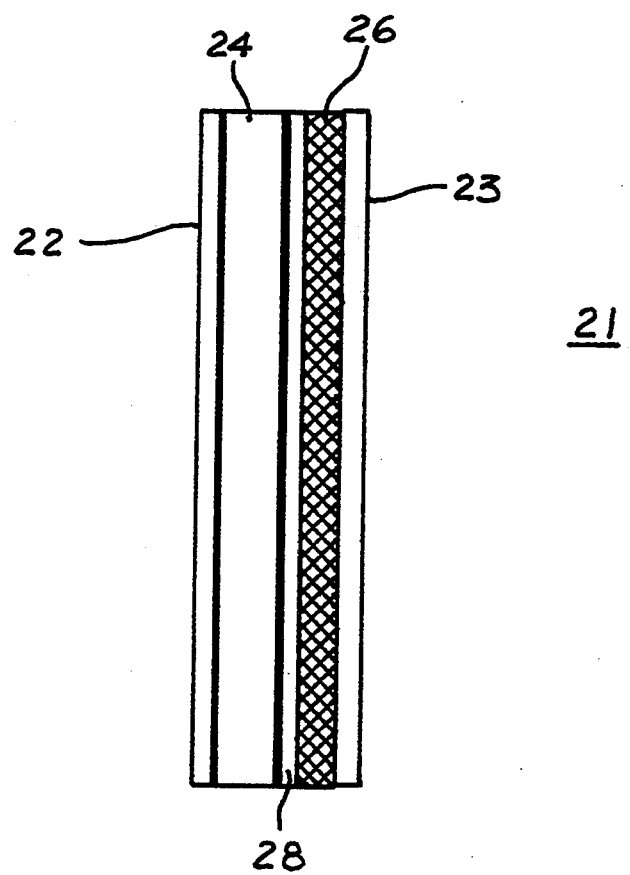
FIG. 4 is a schematic side view of a bipolar cell.

With reference to FIG. 4, a bipolar cell 21 includes a bipolar substrate 22, a bipolar substrate 23, a positive material 24, a negative material 26, and a separator 28. Electrons originating from negative material 26 leave bipolar substrate 23 and return to positive material 24 through bipolar substrate 22. The operation of bipolar cell 21 is in and of itself well known in the art.

A number of bipolar cells 21 may be encased in a cell package to form a battery unit or module similar to modules 82A-H. Bipolar substrates 22 and 23 are preferably a thin metal, conductive plastic, or carbon-resin material. Bipolar substrates 22 and 23 are dimensioned so that the distance between substrates 22 and 23 is very small with respect to the surface area of substrates 22 and 23.

Figure 5:
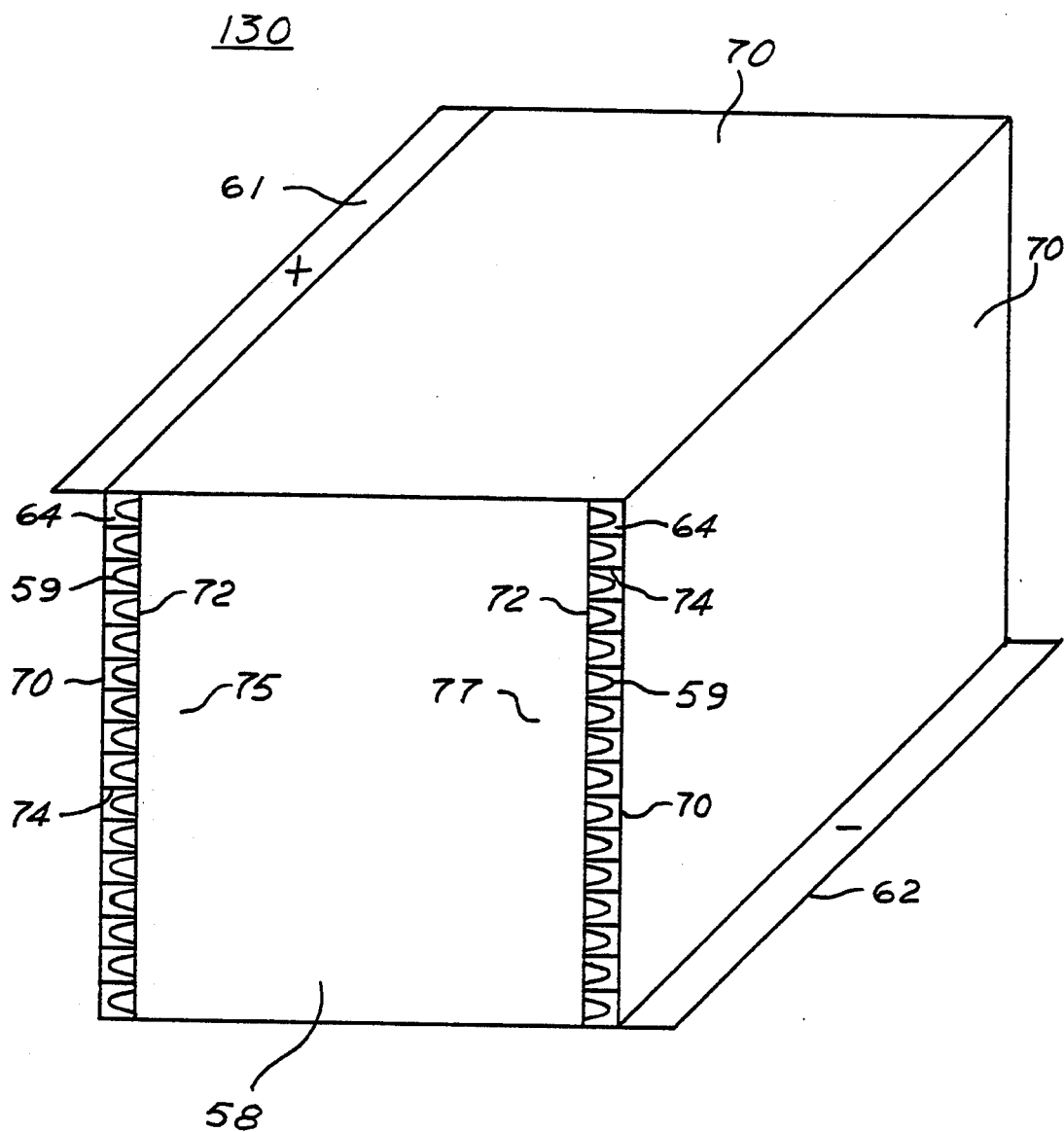
FIG. 5 is a schematic perspective view of a battery in accordance with a second preferred exemplary embodiment in accordance with the present invention.

With reference to FIG. 5, a monopolar battery 130 in accordance with the second exemplary embodiment includes a stack 58 of monopolar modules or monopolar cells, intercell connectors 59, an external electrical connection 61, an external electrical connection 62, and a cooling channel 64. Connectors 59 are preferably located on a first side 77 and a second side 75 of the stack. Preferably, external electrical connection 61 is a positive terminal for battery 51, and external electrical connection 62 is a negative terminal for battery 51.

An external housing 70, cell walls 72 and channel dividers 74 define cooling channels 64. Cell walls 72 are part of the packages or containers for the individual modules in stack 58. Preferably, external housing 70, channel dividers 74 and cell walls 72 electrically insulate connectors 59. External housing 70 is an enclosure or casing for battery 130. Connectors 59 are insulated to prevent malfunction and short circuiting to external contacts, and to prevent connectors 59 from shorting to each other.

Heat which is produced in the individual modules in stack 58 is transported to the exterior of the individual modules by current collectors (not shown). The heat is further transported to the exterior of external housing 70 by intercell connectors 59 and cooling channels 64. Specifically, intercell connectors 59 receive heat from the current collectors. Intercell connectors 59 dissipate the heat to the media in cooling channel 64. The media in cooling channel 64 may be vented to the exterior of battery 130. For example, cooling channels 64 may be arranged vertically so that natural convection allows the heat to rise through channels 64 out of battery 130. As another example, battery 130 may be designed so that channels 64 utilize air flow associated with the movement of the electric vehicle. Alternatively, cooling channels 64 may be coupled to lines 1022 and 1024 discussed with reference to FIG. 1. The fluid provided through channels 64 may be air, water, ethylene, glycol, Freon®, or other cooling media for cooling connectors 59.

Preferably, connectors 59 are shaped with maximum surface area in order to provide maximum heat dissipation. Connectors 59 may be shaped in heat sink configurations including fins, or other geometries for dissipating heat. Cooling channels 64 are preferably rectangular but may be any other suitable shape.

Alternatively, battery 130 may be heated when battery 130 is used in temperatures below the optimum operating temperatures. Heated air or other media is provided through channels 64. Alternatively, the exterior battery 130 is heated. The air or other media in channel 64 heats connectors 59 which in turn provide heat to the current collectors. The current collectors provide heat to the interior of the individual modules.

Figure 6:
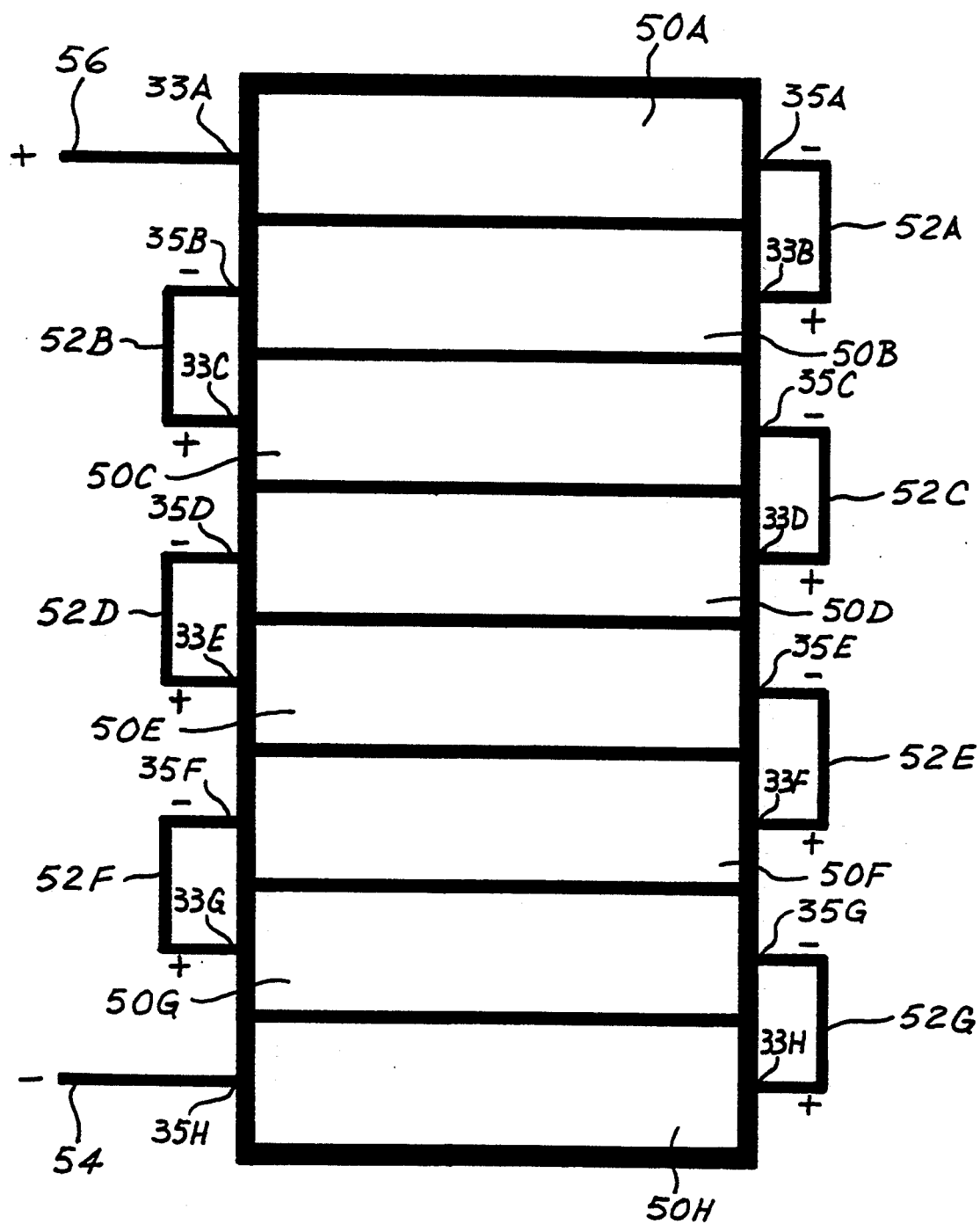
FIG. 6 is a schematic of a battery in accordance with the second preferred exemplary embodiment in accordance with the present invention.

With reference to FIG. 6, a battery 55 in accordance with the second preferred exemplary embodiment of the present invention includes a cell module 50A, a cell module 50B, a cell module 50C, a cell module 50D, a cell module 50E, a cell module 50F, a cell module 50G, and a cell module 50H. Cell modules 50A-H are similar to the modules or units in stack 58. Units of modules 50A-H are stacked with positive and negative terminals on opposite sides of the positive and negative terminals of adjacent modules 50A-H. Battery 55 is preferably a 324 volt battery comprised of 80 4.05 modules such as module 50A arranged in series.

Modules 50A-H include positive current collectors and negative current collectors protruding from module 50A. In particular, a negative current collector 35A is coupled to an intercell conductor 52A. Conductor 52A is coupled to a positive current collector 33B of module 50B. A negative current collector 35B of module 50B is coupled to an intercell conductor 52B. Intercell conductor 52B is coupled to a positive current collector 33C of module 50C. A negative current collector 35C of module 50C is coupled to intercell conductor 52C. Intercell conductor 52C is coupled to a positive current collector 33D of module 52D. A negative current collector 35D of module 50D is coupled to an intercell conductor 52D. Intercell conductor 52D is also coupled to a positive current collector 33E of module 50E. A negative current collector 35E of module 50E is coupled to an intercell conductor 52E. Intercell conductor 52E is also coupled to a positive current collector 33F of module 50F. A negative current collector 35F of module 50F is coupled to an intercell conductor 52F. A positive current collector 33G of module 50G is coupled to intercell conductor 52F. A negative current collector 35G of module 50G is coupled to an intercell current collector 52D. A positive current collector 33H of module 50H is coupled to intercell conductor 52G. Intercell conductors 52A-G are similar to conductors 59 discussed with reference to FIG. 5.

Negative current collector 35H of module 50H is coupled to an external terminal 54. External terminal 54 is preferably a negative terminal which is provided to the outside of battery 55. Positive current collector 33A is coupled to an external terminal 56. Preferably, external terminal 56 is a positive terminal which is provided to the outside of battery 55.

The construction of battery 55 allows heat to be advantageously dissipated from the encasements or packages which enclose modules 50A-H. Heat is generally produced at the center of modules 50A-H. The construction of battery 55 allows the heat to be transported out of modules 50A-H by using positive current collectors 33A-H and negative current collectors 35A-H.

In this embodiment, the heat is dissipated in the same direction as the electric current within modules 50A-H. The heat is transported from each module 50A-H out of the sides having current collectors 33A-H and 35A-H. The metallic construction of positive current collectors 33A-H and negative current collectors 35A-H provides a high heat conductive path for heat to be dissipated out of modules 50A-H. Alternatively, collectors 33A-H and 35A-H may be comprised of a carbonic material.

Figure 7:
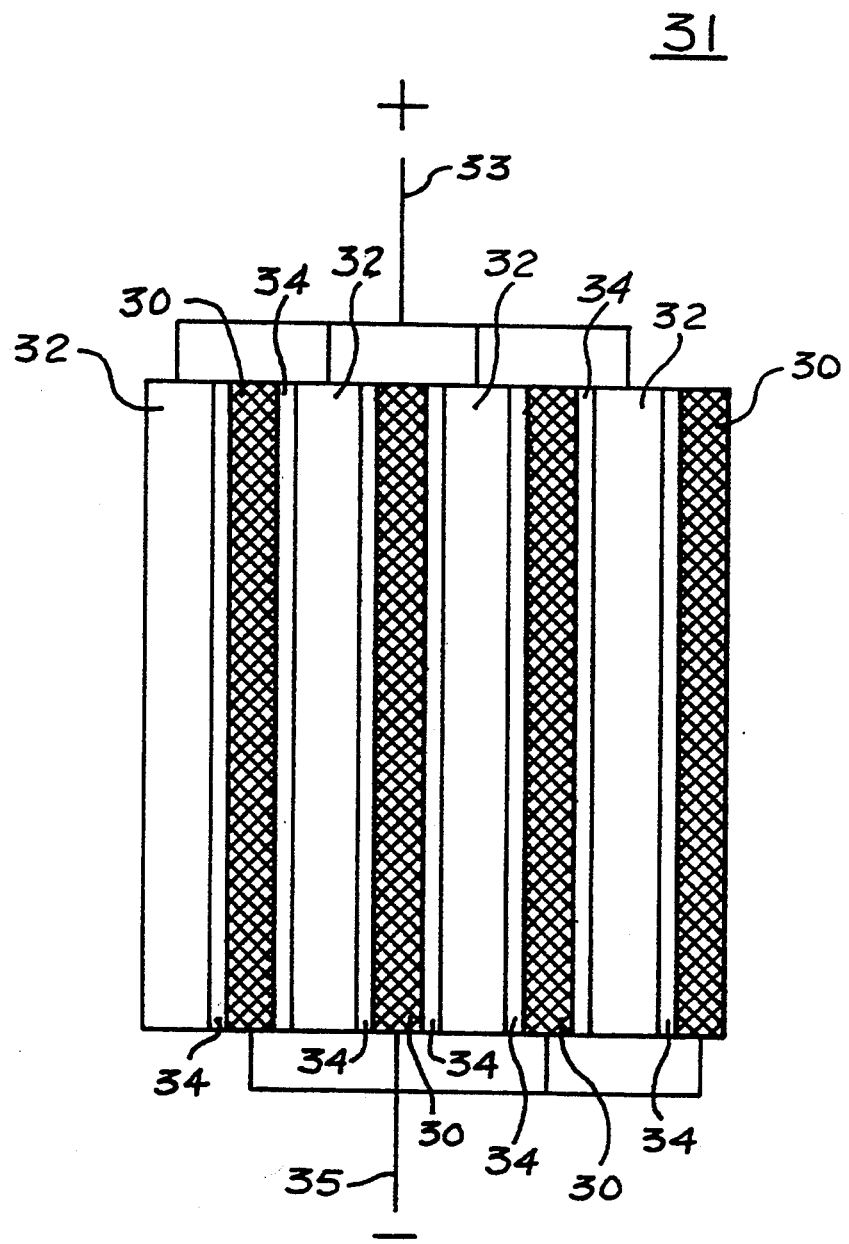
FIG. 7 is a schematic side view of a monopolar cell.

With reference to FIG. 7, a monopolar module or a monopolar cell 31 includes separators 34, positive current collector 33, positive materials 32, negative materials 30, and a negative current collector 35. Negative current collector 35 is coupled to negative materials 30. Positive current collector 33 is coupled to positive materials 32. As is well known in the art, positive materials 32 are preferably positive plates and negative materials 30 are negative plates. Positive and negative current collectors 33 and 35 may be comprised of metals, carbon or other conductive material. Preferably collectors 33 and 35 are highly heat conductive.

Positive materials 32 and negative materials 30 are coupled in parallel by collectors 33 and 35 respectively so that appropriate current capacity is provided by monopolar cell 31. Positive current collector 33 couples all positive materials 32 together and exits cell 31. Preferably, positive current collector 33 is the width of the plates or the grid in cell 31.

Negative current collector 35 couples all negative materials 30 together and exits cell 31. Preferably, negative current collector 35 is the width of the plates or the grid which is coupled to negative materials 30.

Positive current collector 33 and negative current collector 35 leave the cell 31 and the cell package at opposite sides. Positive current collector 33 and negative current collector 35 exit through the walls of the package. Preferably, a hermetic seal surrounds current collectors 33 and 35 at sides of the package.

Figure 8:
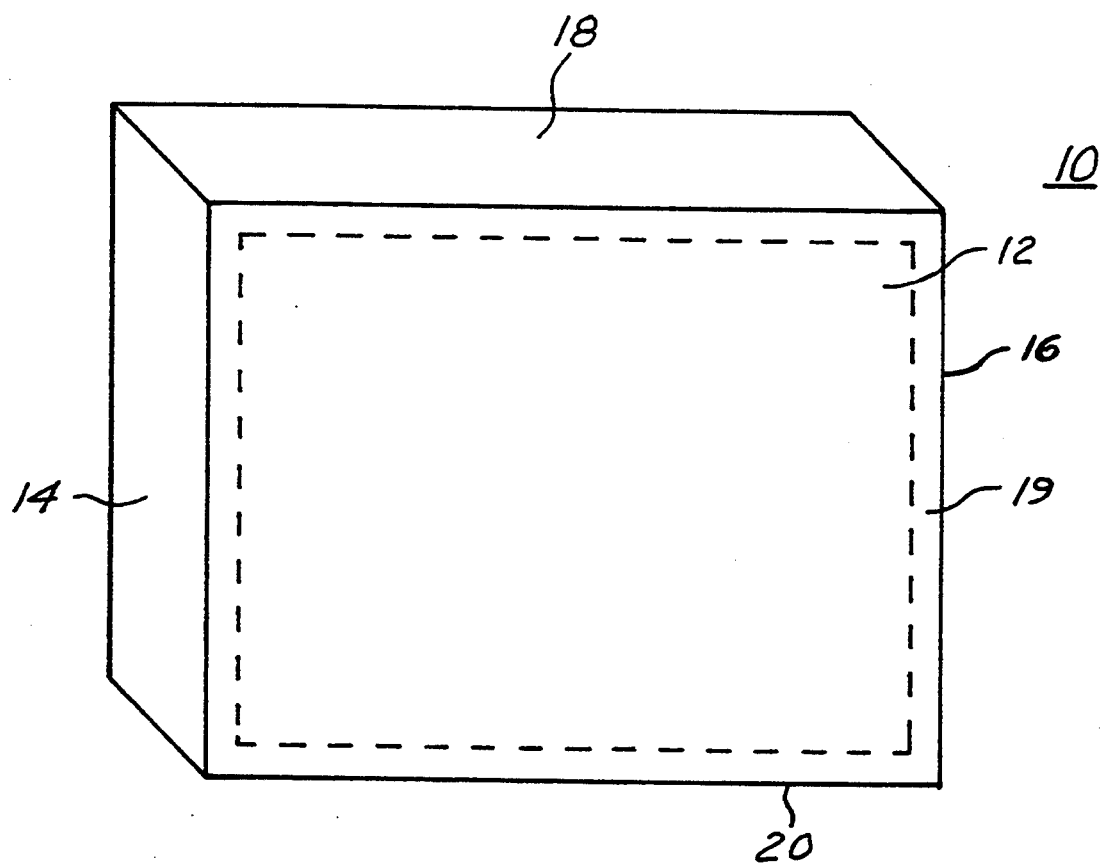
FIG. 8 is a perspective of a cell package in accordance with the preferred exemplary embodiments of the present invention.

With reference to FIG. 8, a cell package 10, in accordance with the preferred exemplary embodiments of the present invention includes a top 12, a left side 14, a right side 16, an upper side 18, and a lower side 20. A bottom (not shown) is opposite top 12. Cell package 10 encloses a bipolar module similar to module 82A–H or a monopolar module similar to module 31 or modules 50A–H with reference to FIGS. 3, 6 and 7. The module is encapsulated by top 12, the bottom and sides 14, 16, 18 and 20. The module includes at least one battery cell. Top 12, the bottom, and sides 14, 16, 18 and 20 are made of an insulative material. In our most preferred embodiment, top 12 is 20.4 cm from left side 14 to right side 16 and 20.4 cm from upper side 18 to lower side 20. The length of the cell or distance between the bottom (not shown) and top 12 is approximately 0.06 cm.

The electrochemical components which make up the battery cell or cells are situated approximately 0.2 cm from left side 14, right side 16, upper side 18 and lower side 20 of cell package 10. The interior of cell package 10 is well known in the art. The interior of cell package 10 is preferably similar to the Lithium battery described in European patent application 0391281A2, filed Mar. 30, 1989, by Sony Corporation. However, the components within the modules and cells within the interior of cell 10 do not limit the scope of the invention. For instance, thin film batteries as well as lead acid or any other battery could utilize the construction of the first or second exemplary embodiments for thermally managing the battery.

Cell package 10 is preferably dimensioned so that a plurality of packages 10 may be advantageously stacked in a tower arrangement. Package 10 preferably includes current collectors (not shown) extending oppositely out of sides 14 and 16. Thus, a stack (not shown) of packages 10 has current collectors exiting side 14 and side 16 of each package. For example, collectors 33 and 35 (FIG. 7) leave cell 31 on sides 14 and 16 of cell package 10. Top 12 of one package 10 would be adjacent the bottom of the next package 10, and the bottom of one package 10 would be adjacent top 12 of the next package 10.

Heat is generally produced in the center of package 10 by the electrochemical components. This heat must be dissipated across a distance 19 and out of sides 16, 18, or 20. Distance 19 is the distance from the internal components to the exterior of cell package 10. Distance 19 is preferably 0.2 cm.

It will be understood that while the various conductors/connectors may be depicted in the drawings as single lines, they are not shown in a limiting sense and may comprise plural conductors/connectors as understood in the art. Further, the above description is of preferred exemplary embodiments of the present invention; the invention is not limited to the specific form shown. For example, while specific interconnection of cells is shown, it is understood that various interconnections could be used. For instance, the size or shape of cooling channels may be modified for particular battery sizes and applications. Further, the internal arrangements of the various modules may also be modified. These, and other modifications may be made in the design and in arrangement of the elements discussed herein without departing from the scope of the invention as expressed in the appended claims.

We claim:

1. A construction for a battery, comprising:
   a plurality of units;
   an intercell conductor external said plurality of units coupled between at least two of said plurality of units;
   a wall surrounding said intercell conductor and said plurality of units, said wall forming a channel, said intercell conductor located in said channel; and
   fluid located in the channel, wherein the fluid located in the channel controls the temperature in the battery, wherein said units are comprised of lithium cells.

2. The construction of claim 1 wherein said units are bipolar units.

3. The construction of claim 1 wherein said units are monopolar units.

4. The construction of claim 1 wherein said intercell conductor further includes heat transfer fins.

5. The construction of claim 1 wherein said intercell conductor is metal.

6. A monopolar battery, comprising:
   a plurality of monopolar modules arranged in a stacks, the stack having a first side and a second side, the stack including a first module having a negative terminal on the first side of the stack and a positive terminal on the second side of the stack, and the stack including a second module having a positive terminal on the first side of the stack and a negative terminal on the second side of the stack;
   a first conductor coupled to the negative terminal of the first module and the positive terminal of the second module;
   an insulator adjacent the first conductor, defining a cavity; and
   a fluid within the cavity that thermally regulates the battery.

7. The battery of claim 6 wherein the fluid is air.

8. The battery of claim 7 wherein the fluid is forced air.

9. The battery of claim 6 wherein the fluid includes Freon ®.

10. The battery of claim 6 wherein the stack is comprised of series connected monopolar modules.

11. The battery of claim 7 wherein the stack further comprises:
a third module having a negative terminal on the first side and a positive terminal on the second side;
a second conductor coupled to the positive terminal of the third module and the negative terminal of the second module; and
wherein the insulator is coupled adjacent the second conductor, the insulator defining a cavity around the second conductor.

12. The battery of claim 11 wherein the cavity adjacent the first conductor is separate from the cavity adjacent the second conductor.

13. A bipolar battery, comprising:
a plurality of bipolar modules arranged in a stack, the stack having a first side and a second side, the stack including a first module having a negative terminal on the first Side, and the stack including and a second module having module having a negative terminal on the first side;
a conductor coupled to the negative terminal of the first module and the negative terminal of the second module;
an insulator located adjacent the conductor defining a cavity around the conductor; and
a fluid within the cavity that thermally regulates the battery.

14. The battery of claim 13 wherein the stack is comprised of parallel connected bipolar modules.

15. The battery of claim 13 wherein the fluid is air.

16. The battery of claim 13 wherein the fluid is forced air.

17. The battery of claim 13 wherein the fluid includes Freon®, glycol, water, or air.

18. The battery of claim 14, wherein each module includes a plurality of bipolar cells coupled in series.

19. A battery, comprising:
a stack comprising a first module, a second module, and a third module, the first module having a positive current collector and sharing a first shared negative current collector module with the second module, the second module sharing a shared positive current collector, with the third module; and
a first wall provided over the first shared positive terminal, the first wall and the stack defining a first tunnel between the wall and the stack, the first tunnel containing a fluid, the fluid being in thermal communication with the positive shared current collector.

20. The battery of claim 19 wherein the first wall forms a containment surrounding the first, second, and third modules.

21. The battery of claim 19 wherein the shared positive current collector is an endplate current collector having a large surface area for dissipating and absorbing heat.

22. The battery of claim 20 wherein the first tunnel is sized to provide turbulent flow of the fluid.

23. The battery of claim 20 wherein the shared positive current collectors have a rectangular cross sectional area.

24. The battery of claim 20 wherein the positive current collector and the shared positive current collector are coupled together by an intercell conductor, the intercell conductor located in the first tunnel.

25. A battery, comprising:
an array of modules arranged in an end-plate to end-plate configuration, each of the modules being enclosed in a module casing;
end-plate current collectors extending out of the module casing of each module; and
intercell conductors coupled with the end-plate current collectors wherein the end-plate current collectors are in thermal and electrical communication with the intercell conductors.

26. The battery of claim 25, further comprising:
a battery casing, the battery casing defining a flow channel;
wherein the end-plate current collectors are contained within the flow channel.

27. The battery of claim 26 wherein the flow channel is electrically insulated.

28. The battery of claim 26 wherein a heat conduction medium is located in the flow channel.

29. The battery of claim 27, wherein the battery casing encases the modules.

30. A thermal management system for a battery, comprising:
cell packages arranged in a tower, the tower having a first current collector side, a second current collector side, a front side, a back side, a top and a bottom;
current collectors provided through the cell packages on the first current collector side and the second current collector side, at least one of certain current collectors on the first current collector side being coupled to at least one of other current collectors on the first current collector side, at least one of certain current collectors on the second current collector side being coupled to at least one of other current collectors on the second current collector side, and
an insulating means for insulating the first current collectors and the second current collectors, the insulating means surrounding the current collectors on the first current collector side and the second current collector side, the insulating means being partitioned into channels, the channels containing a fluid for thermal governance of the current collectors.

31. The system of claim 30 further comprising
a first external connection provided at the first current collector side and protruding through the insulating means; and
a second external connection provided at the second current collector side and protruding through the insulating means.

32. The battery of claim 30 wherein the current collectors are comprised of a conductive carbon portion for providing an electrical connection through the cell package, 33. The battery of claim 32 wherein the current collectors are further comprised of metal for connecting the certain current collectors.

34. A method for manufacturing a battery, comprising the steps of:
providing current collectors through opposite ends of battery modules;
stacking the battery modules so that the battery modules are configured in an arrangement with the current collectors extending from a first side and a second side of the arrangement;

coupling at least one of the current collectors to at least one other current collector external of the arrangement;

containing certain current collectors in channels the channels including a fluid.

35. The method of claim 34 wherein the battery modules are monopolar cells and wherein the step of coupling the at least one of the current collectors further comprises coupling the current collectors in series.

36. The method of claim 34 wherein the battery modules are bipolar modules and wherein the step of coupling further comprises coupling the certain current collectors on the first current collector side in parallel.

37. An arrangement for a battery, comprising:
a plurality of module packages, each enclosed by a module wall, and each module package having a positive current collector and a negative current collector;
at least one intercell conductor electrically coupled to at least two certain current collectors of the positive current collectors and the negative current collectors;
channel dividers coupled to said plurality of cell packages;
a main enclosure surrounding the module packages, the intercell conductors, and the channel dividers, the main enclosure, the module walls, and the channel dividers forming flow channels; and
wherein the intercell conductor is located in one of the flow channels; and
wherein the at least one intercell conductor couples the positive current collector of one of the module packages to the positive current collector of another of the module packages; and
wherein the module packages include a plurality of bipolar cells coupled in series.

38. The arrangement of claim 37 wherein the at least one intercell conductor couples the negative current collector of one of the module packages to the positive current collector of another of the module packages.

39. The arrangement of claim 37, further comprising:
a positive external connection electrically coupled to at least one positive current collector and provided through the main enclosure; and
a negative external connection electrically coupled to at least one negative current collector and provided through the main enclosure.

* * * * *